United States Patent [19]

Hart

[11] Patent Number: 4,501,381

[45] Date of Patent: Feb. 26, 1985

[54] PURIFIED WATER DISPENSING MACHINE

[76] Inventor: John E. Hart, 1614 N. Missouri Ave., Largo, Fla. 33540

[21] Appl. No.: 489,120

[22] Filed: Apr. 27, 1983

[51] Int. Cl.³ .............................................. B67D 5/10
[52] U.S. Cl. ...................................... 222/2; 222/249; 222/263; 194/3
[58] Field of Search ................... 222/2, 249, 250, 252, 222/263, 265; 194/3, 92, 93; 137/625.33, 625.37

[56] References Cited

U.S. PATENT DOCUMENTS

| | | | |
|---|---|---|---|
| 801,612 | 10/1905 | Schramm | 222/249 |
| 2,292,658 | 8/1942 | Quintrell | 222/2 |
| 2,427,429 | 9/1947 | Waite et al. | 222/2 |
| 2,576,747 | 11/1951 | Bryant | 222/250 |
| 4,162,750 | 7/1979 | Demens et al. | 222/250 |

*Primary Examiner*—Joseph J. Rolla
*Assistant Examiner*—Kenneth Noland
*Attorney, Agent, or Firm*—Ronald E. Smith

[57] ABSTRACT

A coin-operated purified water dispensing machine. A pair of vertically stacked transparent fill tubes are mounted in a cabinet in visually exposed relation to a consumer operating the machine. A water dispensing nozzle is associated with each fill tube and is protected by a shroud that is specifically configured to engage the upper portion of a container to aid the consumer in properly positioning the container to be filled. The consumer activates the machine by placing the required coins in a coin chute. Acceptance of the coins effects rotation of a rotatably mounted cam that is fixedly secured to and in axial alignment with a four-way valve that in turn controls the flow of water into and out of the machine. The fill tubes are capped by end plug members having specific sealing and a piston is slidably mounted for reciprocating movement within each fill tube to effect vending of a precise volume of purified water.

10 Claims, 18 Drawing Figures

FIG_1

FIG_2

FIG_3

FIG_4

FIG_5

FIG_6

FIG_7A

FIG_7B

FIG_7C

FIG_7D

FIG_7E

FIG_10

PURIFIED WATER DISPENSING MACHINE

BACKGROUND OF THE INVENTION

1. Field of the Invention

This invention relates generally to a coin-operated purified water dispensing device that accurately measures and dispenses a given amount of water by hydraulic action.

2. Description of the Prior Art

A search of United States Patents that was conducted prior to the filing of this disclosure located the following United States Patents in the general field of this invention:

| Patentee    | U.S. Pat. No. | Date of Issue |
| ----------- | ------------- | ------------- |
| Van der Plas | 2,358,268    | 09-12-44      |
| Little      | 2,617,510     | 11-11-52      |
| Loebel      | 3,074,216     | 01-22-63      |
| McAbee      | 3,221,859     | 12-07-65      |
| Young       | 3,565,228     | 02-23-71      |

The field of search included Class/sub-class 62/389, 222/2,442, 453, 194/2,13,43, Des. 20/1,4.

Most conventional purified water dispensing machines have means in fluid communication with an external pressurized water source that supplies the water to be purified and dispensed. The pressure provided by such external sources varies substantially from time to time. Moreover, the internal resistance of a conventional machine's purifying system will increase with use. Thus, conventional machines do not vend the proper volume of water on a regular basis unless they are continually adjusted. Such adjustments are difficult to make and are expensive as well, in view of their frequency. To allow for the vending errors that are a product of line pressure fluctuations and internal resistance buildup, the manufacturers of conventional machines simply set such machines so that they will dispense more than their stated measure. Thus, a machine having a stated measure of one gallon per vend may dispense one and one tenths gallons to insure that at least the stated measure will be dispensed. Accordingly, the containers into which the water is dispensed will often overflow in the presence of the consumer. Not only does this form of waste displease the average consumer but such overflow also necessitates the provision of a drain to handle the wasted water.

Many conventional machines rely upon sophisticated electronic circuitry to measure and dispense water. Unfortunately, these electrical machines not only fail to adequately compensate for pressure fluctuation and pressure drop, but they also limit vending flow rate, increase the initial cost of the machine, and give rise to continual repair bills as the machines malfunction from time to time.

Accordingly, there is a need for a purified water dispensing machine that does not consume expensive electrical power as do the earlier machines.

Moreover, there is a need for a smaller machine so that expensive floor space can be used in a more optimal manner. A clear need further exists for a machine that does not require pressure or flow regulators and which need not be connected to a drain.

An improved machine would also dispense water at a much faster rate than the machines of the prior art. The preferred machine would be devoid of electrical apparatus such as switches, changers, solenoid valves, and the like, which devices are subject to corrosion and pitting.

A machine that would overcome the limitations of earlier machines does not appear in the prior art.

SUMMARY OF THE INVENTION

The longstanding but heretofore unfulfilled need for a purified water dispensing machine that consumes no electrical power and that dispenses its stated measure quickly and accurately is now provided in the form of a compact, coin operated device. A mechanical coin accepter mechanism including a slide means receives the required coinage for the vend. A flexible metal tongue conjointly moveable with said slide means engages a pin on a four-way valve cam means when the consumer activates the machine by pushing in the slide means. The forward motion of the coin slide and tongue rotates the cam means ninety degrees. The cam means is operatively connected to rotary action four-way valve which, upon being rotated ninety degrees, reverses an "in" supply and an "out" discharge of water from one end of a displacement tube to the other. The aforesaid ninety-degree rotation will admit water into the end of the displacement tubes (in the preferred embodiment there are two displacement tubes) where the piston is disposed. The pressure of the incoming water pushes the piston the length of the tube, thereby displacing water therefrom. The inside diameter of the displacement tube may vary and may not be perfectly round, so the piston is provided with specifically formed "O" rings that prevent leakage as the piston traverses the length of the displacement tube. Upon the completion of the piston stroke, the piston stops and seals against a static "O" ring embedded in the surface of a plastic end plug. Such seating terminates the discharge of water from the displacement tube and prepares such tube for the next vend. The end of the displacement tube vacated by the piston is now filled with water under pressure, and a reversal of the four-way valve on the next vend causes the piston to return to its initial position. In this manner, the piston is seen to reciprocate.

In the preferred embodiment, the inventive machine resides in a cabinet having a top portion and a bottom portion. The bottom portion contains conventional filtration equipment, and of course supports the top portion. The top portion includes a pair of horizontally disposed transparent displacement tubes that are arranged in vertically stacked relation to one another, i.e., an upper displacement tube overlies the lower tube. The forward cylindrical sidewalls of each tube are exposed to view, but a complementally formed metallic reflector means overlies the external rearward sidewalls of each tube. Such reflector shields the interior of the machine from the consumer's view and may provide a background for promotional signs and pictures. The magnifying effect of the water in the tube enhances this view.

The displacement tubes are supported at their respective opposite ends by a pair of spaced, upstanding side box members. The side box members also enclose the coin chutes, the four-way valves, and money boxes. A jug-filling area is collectively defined by the side box members, a back panel, and the top of the aforementioned bottom portion.

The top surface of the bottom portion of the invention slopes toward the rear of the inventive machine, and a trough is formed at the rearmost edge of the top surface or counter to collect any water accidentally spilled from the jugs. Such backward slope also facilitates the sliding of plastic jugs under a protective shroud that surrounds the sanitary fill spouts. Such spouts are preferably disposed rearwardly of the displacement tubes, and depend into the jug filling area. Consequently, the fill spouts surrounded by their respective protective shrouds are readily visible to the consumer, in the absence of printed instructions, and it will be apparent to the consumer that the jugs to be filled are to be brought into registration with the protective shrouds.

The displacement tubes are transparent so that the consumer can see the water that will be vended when the machine is activated. Unlike bottled water on a store shelf, this water is under pressure to assure cleanliness and freshness. The consumer can more easily position his or her container directly under the fill spout because the protective shroud is specifically formed to center itself on the sloping shoulder of the consumer's container. The shroud also protects the actual water outlet from physical contact. During the vending cycle, the consumer can observe the progress of the vending action as the acrylic piston with its bright colored "O" rings moves across the tube.

It is therefore seen that an important object of this invention is to provide a purified water dispensing machine that is coin operated, visually entertaining, non-power consuming, and economical to manufacture.

Another object is to provide such a machine that takes up less floor space than conventional machines, provides a means whereby the consumer may easily position the jugs to be filled, and which rapidly dispenses the water.

The invention accordingly comprises the features of construction, combination of elements and arrangements of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
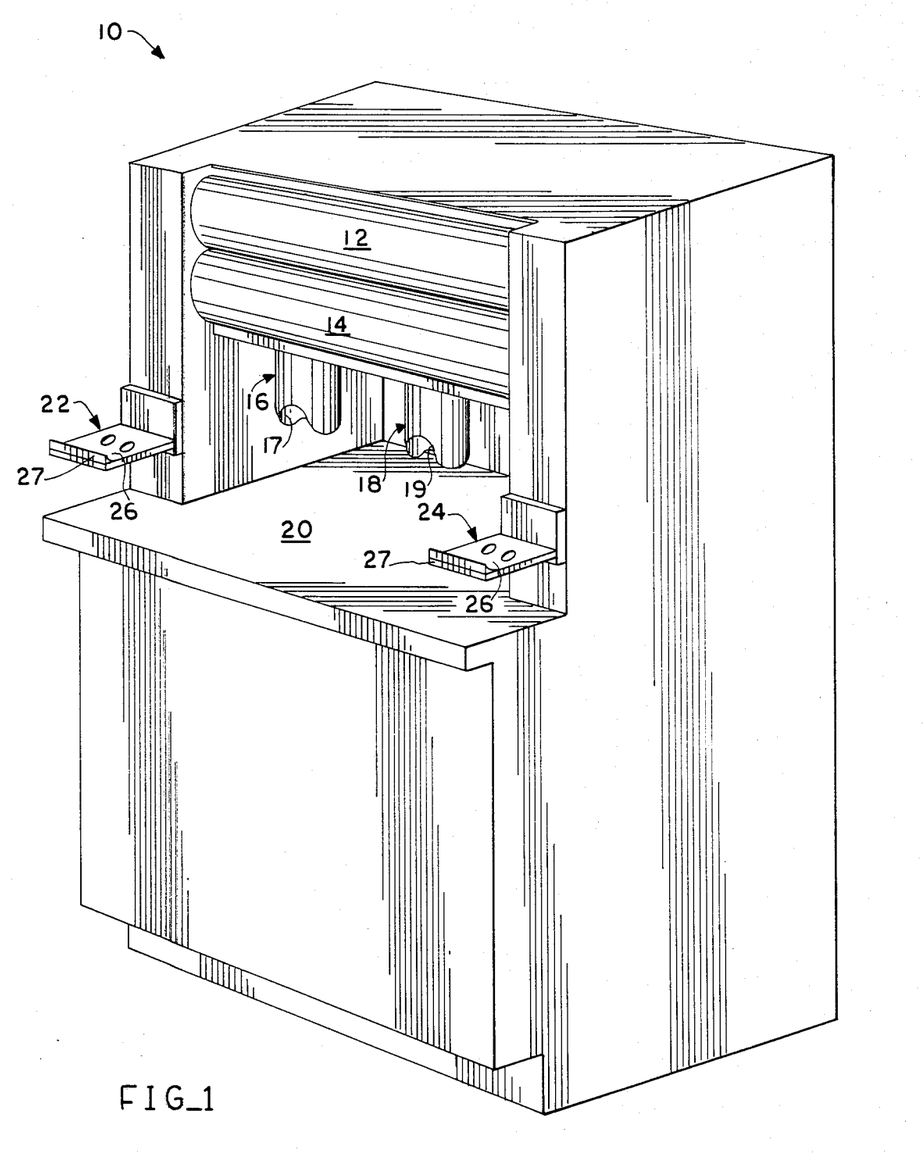
FIG. 1 is a perspective view of the preferred embodiment of the invention.

Referring now to FIG. 1, it will there be seen that the preferred embodiment of the invention is designated by the reference numeral 10 as a whole. In the form of the invention shown, two jugs may be filled with water simultaneously, although it should be understood that the invention could be provided in the form of a machine that would dispense only one gallon of water at a time, three gallons at a time, and so forth. The use of two fill tubes in the preferred embodiment is therefore understood to be for illustrative purposes.

Figure 2:
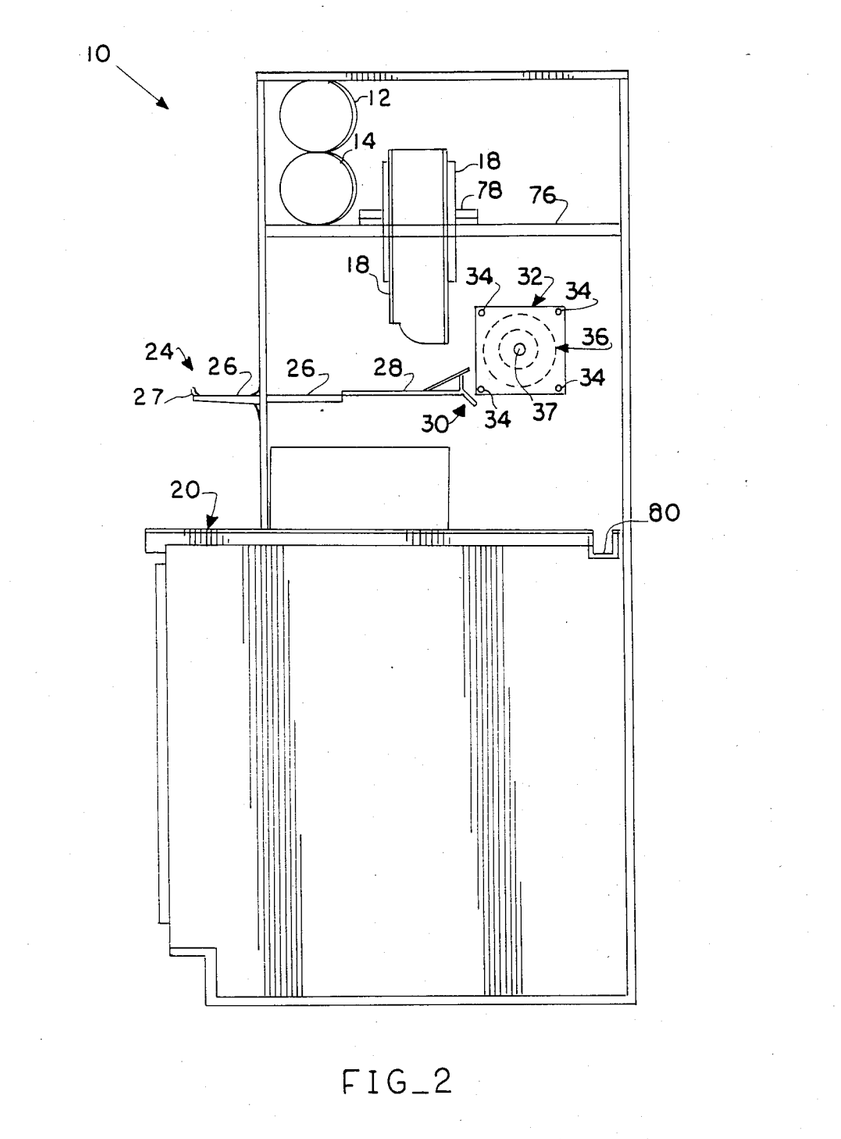
FIG. 2 is a side elevational, partially cut-away view showing the operative elements of the invention.

The fill tubes 12, 14 are shown disposed in horizontal alignment and in vertically stacked relation to one another. A pair of laterally spaced shroud members 16, 18 are disposed rearwardly thereof, as best shown in FIG. 2, and such members serve a dual purpose. First of all, the distal free end of each shroud means is specifically configured as at 17, 19 to engage the upper sidewalls of a gallon jug to thereby properly position, or center, the same during the filling procedure. The second function of each shroud member is to protect or shield from the environment and human contact the discharge nozzle (shown in FIGS. 8 and 9) that actually dispenses the water. When the machine is in use, the gallon jugs to be filled are placed on the support surface 20, which is rearwardly sloped to assist the consumer in making the necessary alignment of the jug and the shroud means. Essentially conventional coin receiving members 22 and 24 are shown, each being associated with a different fill tube and discharge nozzle means, of course.

Each of the mechanical coin chute mechanisms 22, 24 includes a movable slide member 26 that extends into the interior of the machine (see FIG. 2). Each slide 26 is provided with apertures externally of the machine, as is clearly shown in FIG. 1, to accommodate coins and has an upwardly turned portion at its distal free end as at 27 to facilitate pushing such slide with one's hand. Within the machine 10, the slide 26 interacts with a mechanism that measures and allows passage of coins according to their thickness, diameter, and magnetic quality and refuses to accept counterfeit coins. A flexible metal tongue 28 (FIG. 2) is fixedly secured to the end of each slide 26 as shown so that such tongue 28 is, in effect, an extension of the slide 26. A metal projection having the general shape of the letter "A" is fixedly secured to the distal free end of the tongue 28, and is designated 30 as a whole. A rotatably mounted valve cam member 32 having integrally formed pin members collectively designated 34 projecting therefrom is cooperatively positioned relative to member 30 so that the member 32 is rotated in the manner shown in FIGS. 7A-7E responsive to coin-permitted activation of slide member 26. In the absence of coins, the slide 26 will not engage any of the pins 34 and will return to its normal position by spring action. When coins are inserted, the slide will operate as shown in FIGS. 7A–7E, it being understood that it cannot return to its at rest position until it has first been fully extended, so that the coins are committed and cannot be retrieved.

Figure 5:
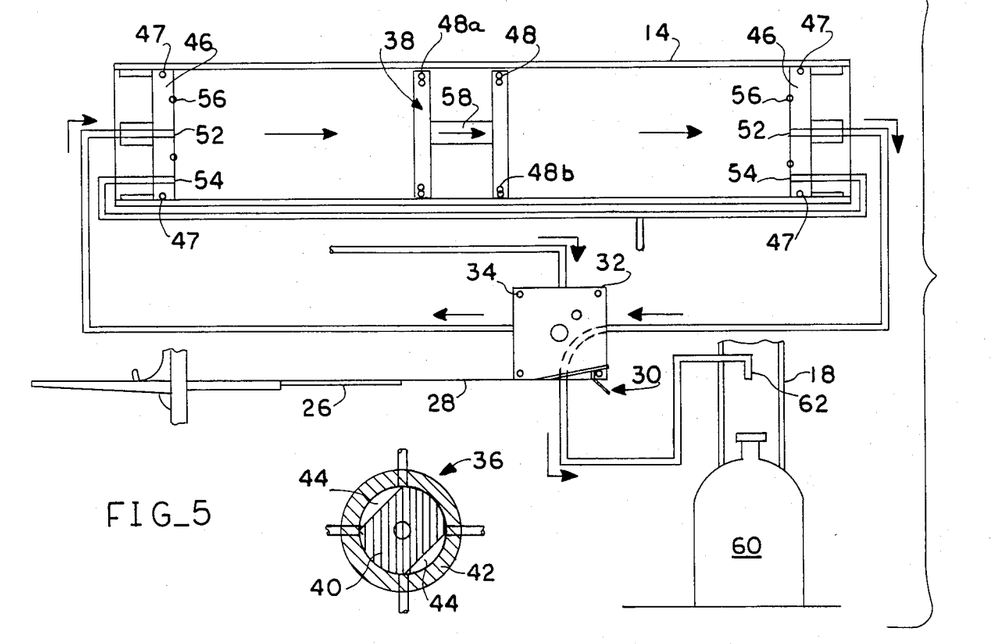
FIG. 5 is a diagrammatic view showing the rotatable valve means rotated another forty-five degrees counterclockwise from its position as shown in FIG. 4.
Figure 6:
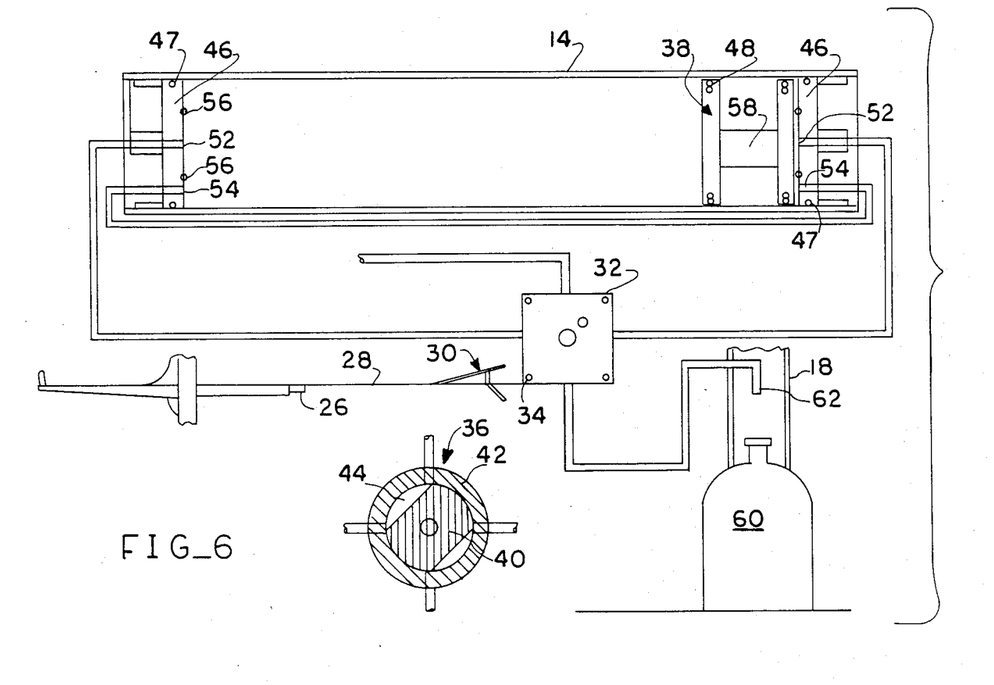
FIG. 6 is a diagrammatic view showing the position of the inventive parts when the vending cycle has been completed.
Figures 7A, 7B:
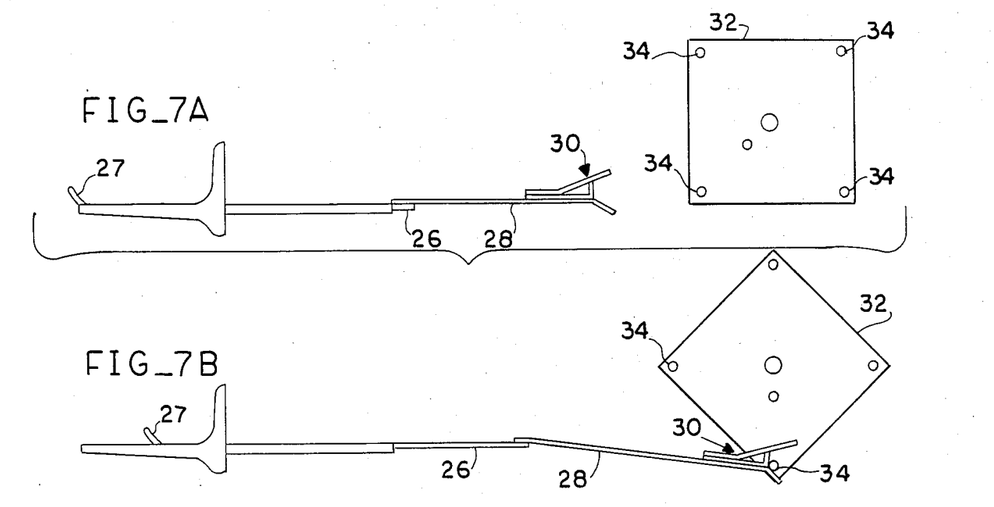
FIGS. 7A-7E are sequential depictions showing one ninety-degree levorotation of the inventive valving means.
Figure 7C:
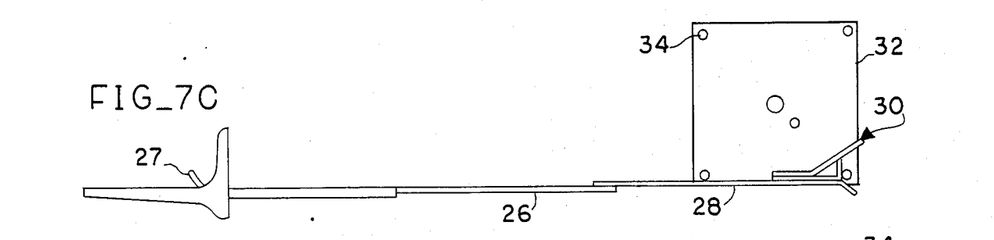
Figure 7D:
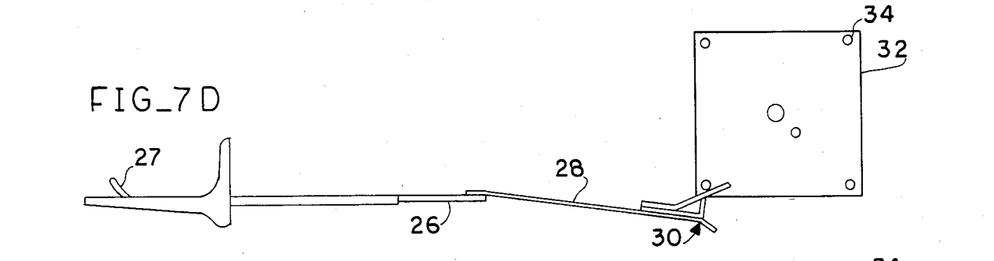
Figure 7E:
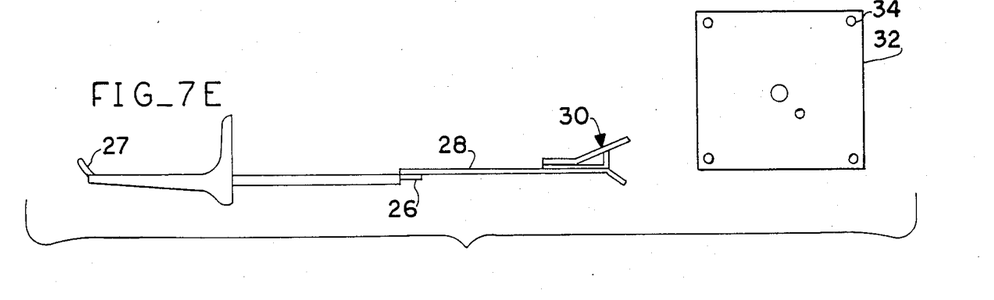

The cam 32 is fixedly secured to a four-way valve 36 that is rotatable conjointly with cam 32. The cam 32 is positioned relative to the coin slide 26 such that the valve 36 has its axis of rotation 37 perpendicular to and spaced vertically upward of the slide 26 thereby positioning a pair of cam pins 34 in substantially the same plane as that of the slide 26 and tongue 28, as is clearly shown in FIG. 2. At full extension of tongue 28 (FIGS. 5 and 7C), a gap in the coin slide allows the release of a dog member—not shown—that had prevented rearward motion thereof. Thus, the slide can return to its normal position and is returned to such normal position by a spring and by the consumer. During the return, the member 30 deflects downwardly as shown in FIG. 7D, due to the flexibility of tongue 28, thereby avoiding unwanted rotation of cam 32. Accordingly, subsequent acceptance of coins and movement of the coin slide and tongue will rotate the four-way valve 36 ninety (90) degrees on each motion and always in the same rotational direction.

The direction of water flow into or out of a displacement tube 12 or 14 is reversed attendant each ninety-degree rotation of valve 36. Valve activation initiates a flow of water from the full end of a dispensing tube to a container and terminates the flow when a piston 38 (FIGS. 3–6) reaches the opposite end of the tube and the given amount, typically a U.S. gallon, is dispensed. Simultaneously, the opposite end of the dispensing tube is filled with water.

Figure 10:
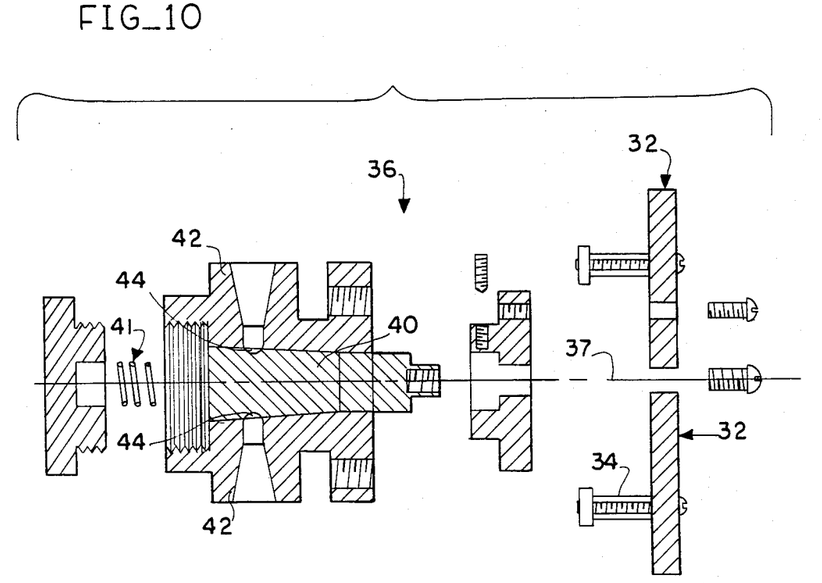
FIG. 10 is an exploded, cross-sectional view of the four-way valve means inventively employed in the novel machine.
Figure 11A:
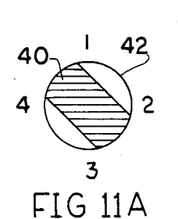
FIGS. 11A-11D are cross-sectional end views showing the sequential positions assumed by the valve means responsive to three distinct ninety-degree rotations in a levorotational direction.
Figure 11B:
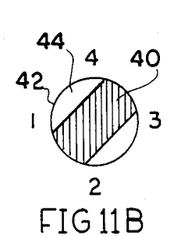
Figure 11C:
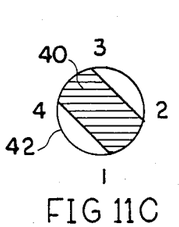
Figure 11D:
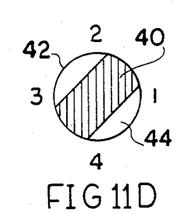

The rotating part of the four-way valve 36 includes a preferably square plastic plate 32, as aforesaid. A valve shaft 37a is affixed to the center of plate 32 and thus is rotatable about the axis of rotation 37 of the four-way valve assembly 36. A tapered rotor 40 is carried by shaft 37a and thus rotates conjointly with it responsive to engagement of a pin 34 by member 30. The stationary, or non-rotating part of the four-way valve 36 is a cylindrical valve body 42 that the rotor 40 precisely fits and within which it turns. Four equidistantly and circumferentially spaced ports designated "In", "Out", "L" (left), and "R" (right) are formed in body 42, substantially mid-length thereof. These ports align with two parallel grooves cut into opposite sides of the rotor 40, thereby forming the cavities for fluid passageways designated 44.

Figure 3:
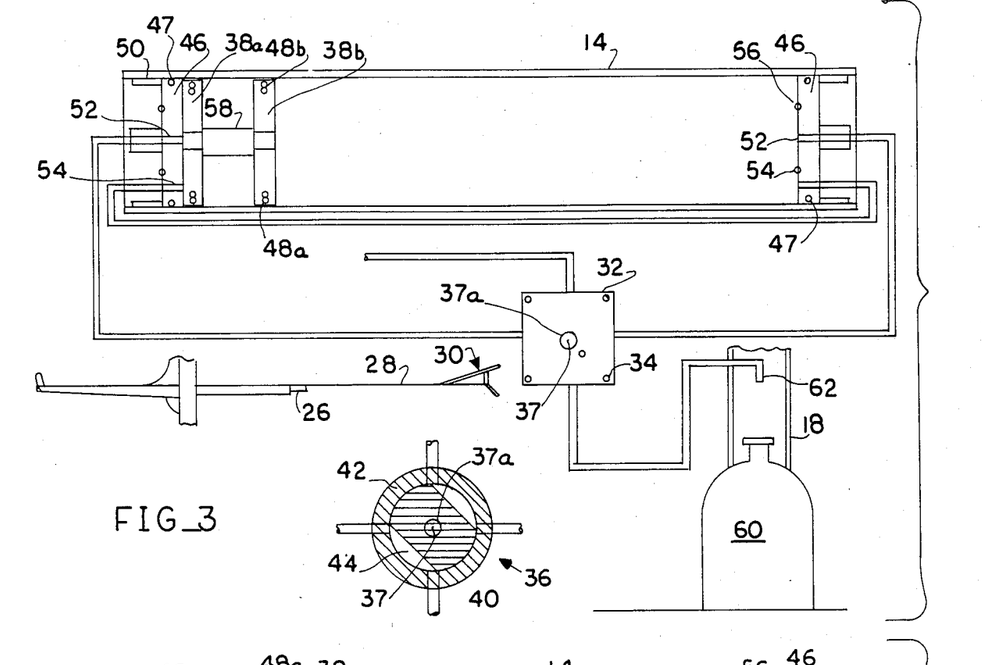
FIG. 3 is a diagrammatic view showing the position of the cam member and valve member when the machine is not in use.

The depth and length of each groove is specifically selected to precisely connect two adjacent ports, as shown in FIG. 3.

Figure 4:
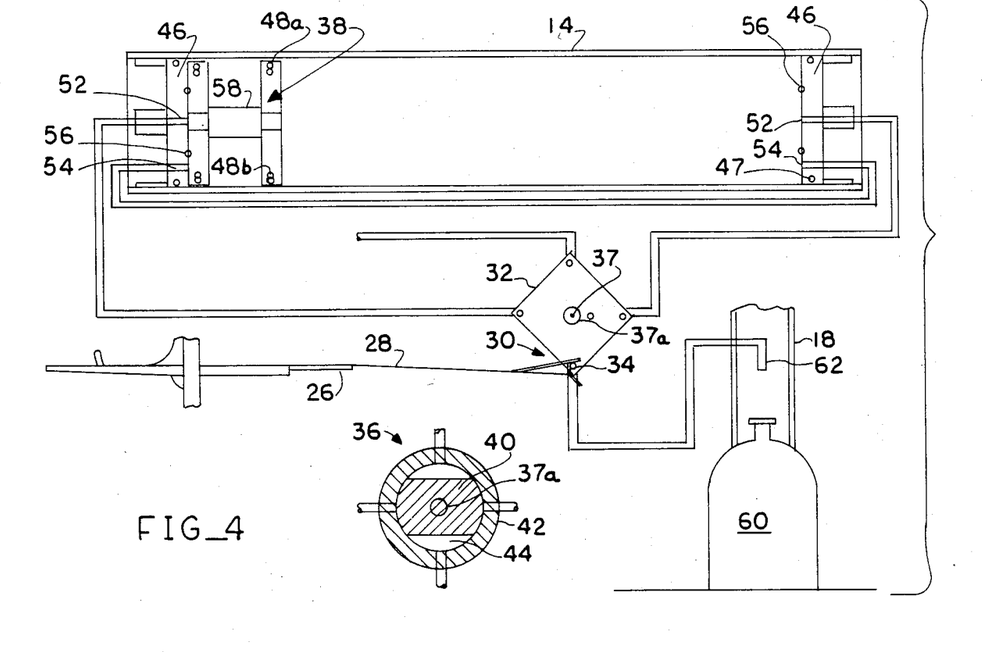
FIG. 4 is a diagrammatic view showing the position of the rotatable cam means and the rotatable valve means after coins have been deposited into the coin chute, and with the rotatable valve means rotated forty-five degrees in a counterclockwise direction from the view shown in FIG. 3. (All ports are thus closed).

The rotor 40 seals against passage of water between its tapered surface and the valve body 42, allowing passage only through the grooves 44 which are spaced from the valve body. The rotor 40 is a tapered cylinder (as shown in FIG. 10) which is held against a corresponding sidewall of the valve housing by a spring 41 at the large end of the rotor. This pressure and precise fit effects the water seal. Furthermore, the rotor, being made of a self-lubricating type thermoplastic, makes a seal while moving with little friction and wear. A minor amount of water will only seat the rotor a little deeper with no loss of sealing capability and inconsequential misalignment. The diameter of the rotor 40 in relation to the depth of the grooves provides a dead spot where no connection between ports is possible when the rotor has been rotated forty-five (45) degrees off direct alignment over the ports, as shown in FIG. 4. During coin slide movement and valve rotation, the dead spot will occur after the coins are committed and the slide is locked against its returning. This prevents the consumer from inserting coins and partially pushing in the slide to start water flow, then returning the slide to retrieve the coins. It also prevents cross porting where all ports could be momentarily connected. This would cause incoming water to bypass directly to the outgoing connection without going through the displacement tube.

The depth of the rotor grooves 44 and relative diameter of the rotor 40 are limiting factors in the flow rate of the valve. However, the leverage of a two-inch lateral movement to a ninety (90) degree rotation of a three quarter inch diameter rotor enables the valving of two water sources with little physical effort. It provides approximately twice the flow rate than that of an equivalent direct action electric solenoid valve means commonly used in small fluid dispensers.

The displacement tubes 12, 14 will now be described. Although the displacement tubes can be made of metal or plastic, either material must be reasonably uniform in dimension and shape with a smooth inside surface (or be machined to a uniform surface). Other than dimensional differences, design characteristics are basically the same for either type with these exceptions:

Thermoplastic tubes are not used where they will be exposed to ultraviolet light. With tensile strength less than metal and the displacement tube subject to water hammer, thermoplastic tubes are protected with diaphram type shock arrestors. Because transparent displacement tubes with the moving pistons are more appealing and entertaining to the consumer, this type of displacement tube is herein described.

The size of the tube is determined by the fluid volume to be vended. Normally the vend will be one U.S. fluid gallon (231 cubic inches). Therefore, the formula for finding the size of a cylinder for displacement volume is as follows:

Length of cylinder = Length of piston + $(231/\pi r^2)$

As shown in FIGS. 3–6, end plugs 46 close the open ends of the tubes 12, 14. Plugs 46 are sealed about their circumference with "O" rings 47 and secured by adjustable plastic clips 50 that, in turn, are bolted through the walls of the displacement tube. The adjustment feature of the plugs 46 allows the operator (not the consumer) to make a one-time adjustment of the displacement volume. This volume remains constant once set. An outlet 52 is provided in the center of each plug 46 and another outlet 54 is formed therein adjacent the periphery thereof. The center outlet 52 is in fluid communication with the four-way valve 36 and allows water to enter and exit the cylinder. The peripheral outlet 54 is in fluid communication with a drain means. Thus, a machine operator (not the consumer) can allow drainage of water through opening 54 as water enters opening 54 to create circulation within the tube to sweep out any sediment or pipe debris that may be entrapped in the tube. Once the tube has been cleared, this procedure normally need not be repeated where highly filtered water is used.

Another "O" ring 56 is embedded within the inside face of each end plug 46 to absorb the shock of the piston 38 striking such eng plug and to seal the center aperture 52 when the piston 38 is at that end. Ring 56 also spaces the piston 38 relative to center aperture 52 thereby allowing a larger surface for water to push against when the piston 38 begins its return stroke.

The pistons 38 are formed by adjoining two transparent plastic discs 38a, 38b by a smaller diameter transparent plastic spindle 58. The discs 38a, 38b are sized to an outside diameter that is slightly less than the minimum inside diameter of the displacement tubes 12, 14. A groove is formed in the circumference of each disc to accommodate two "O" rings, 48a overlying 48b. The outside diameter of the inner ring 48b is the same as the inside diameter of the outer ring 48a so that both rings 48 are concentric when in place. The depth of the groove provides a space between the bottom of the piston groove and the inside surface of the displacement tube 12, 14 that is slightly smaller than the total of the two cross-sections of the "O" rings 48. This compresses the elastic rings 48 so that the resilient outer ring 48a will conform to any irregularities of the sidewall as the piston 38 is moving, thereby providing a seal between the piston and the interior sidewalls of its associated tube 12, 14.

The outer "O" ring 48a is formed of a flexible elastomer having a relatively low friction coefficient and slides easily with respect to the plastic internal sidewalls in the absence of vibration and with minimal wear. The space between the discs 38a, 38b and around the spindle 58 is filled with water to lubricate both sides of the "O" rings 48. The inside ring 48b does not bear against a moving surface and is made of an elastomer plastic to provide extra flex.

In normal operation, the pressure differential across the moving piston 38 will be about one fourth (¼) the line pressure that is present when the piston is at rest. Accordingly, there is less chance for bypass around the piston rings 48 when the piston 38 is moving. At rest, the piston presses against the static seal 56 in the end plug 46 providing the third "O" ring seal against leakage when the pressure differential is the greatest.

Figure 8:
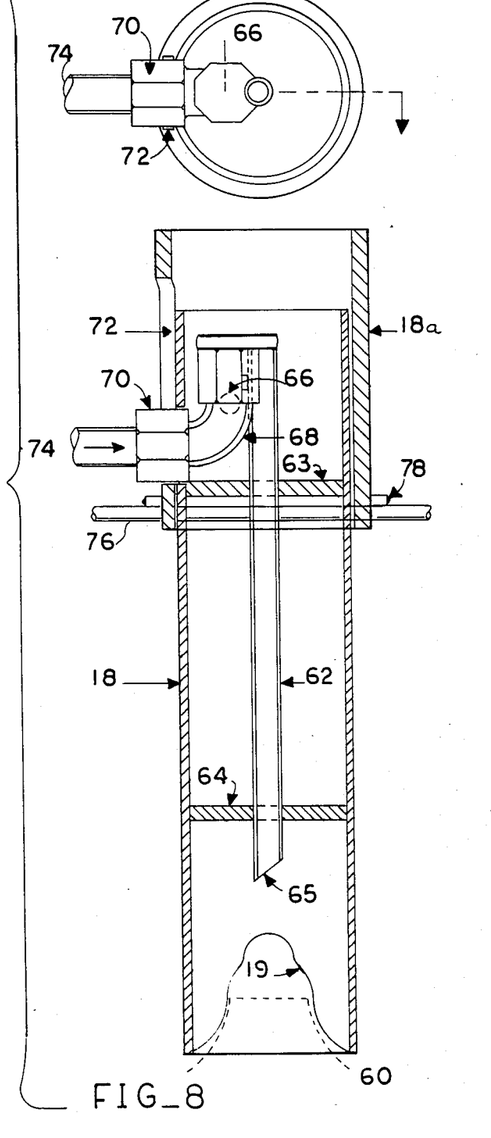
FIG. 8 is a partial sectional and side elevational view showing how the inventive shroud assembly is slidably mounted.
Figure 9:
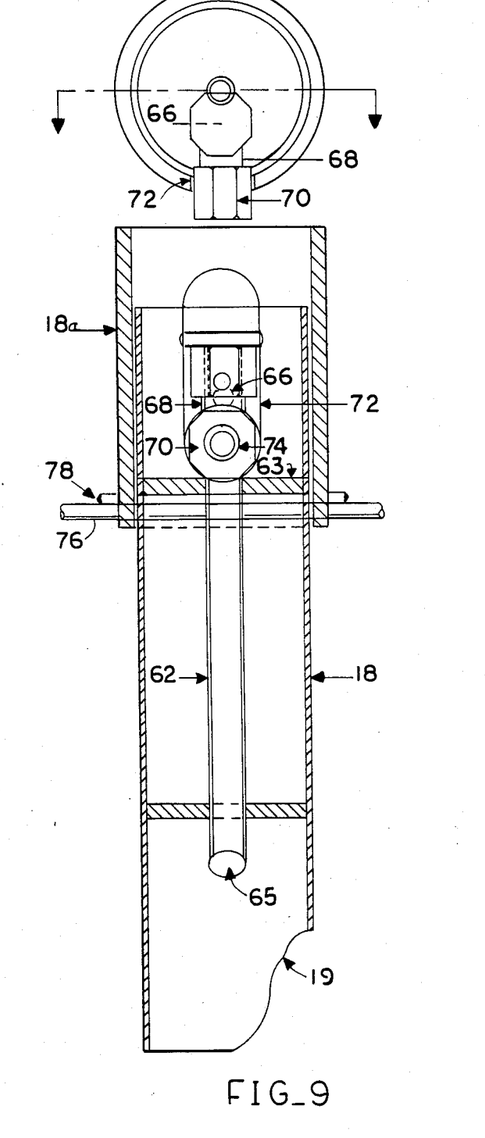
FIG. 9 is a front elevational view of the part shown in FIG. 8.

The fill spouts, or shroud members 16, 18 were mentioned briefly hereinabove. Reference should now be made to FIGS. 2, 8, and 9.

The complete sanitary fill spout assembly includes shroud members 16, 18 that are formed by transparent plastic tubes, and shroud guide members 16a, 18a. Each shroud member is slidably received within its corresponding shroud guide member in telescoping relation thereto. As shown in FIG. 2, the shrouds and guide members are disposed rearwardly of the fill tubes 12, 14. As shown in FIGS. 8 and 9, a water dispensing tube 62 is surrounded by its associated shroud. The spacing between the floor 20 of container filling area and the lower rim 17, 19 of the shroud 16, 18 is just short of the height of a U.S. gallon plastic jug at its shoulder. Thus, insertion of a jug 60 will transiently displace a shroud 16, 18 upwardly, due to its aforesaid telescopic mounting relative to its guide member. The weight of the shroud assembly and the slope of the shoulder of the jug 60 will properly center such jug 60, as desired. Since the distal free ends 17, 19 of shrouds 16, 18 conform to the shape of a jug 60's shoulders, and due to the slidable mounting of shrouds 16, 18, a jug may be centered correctly with only one hand, there being no need to lift the shroud with the other hand.

The water dispensing tube 62 within each shroud 16, 18 is positioned centrally of the shroud by two vertically spaced transparent plastic discs 63, 64. Disc 64 at the distal end 65 of water tube 62 is just beyond finger reach from the bottom rim 17, 19 of a shroud 16, 18. Th water tube 62 is connected to a check valve 66 as shown in FIG. 8. Valve 66 seals against any air entering the water line beyond such point. Water below the check valve 66 will completely drain into the jug 60. An elbow male connector 68 is centered through the upper disc 63 directly above the check valve. Lateral compression nut 70 of the elbow 68 extends through an opening formed in the shroud 16, 18 and into a vertical slot 72 in the shroud guides 16a, 18a. Nut 70 thereby acts as a key means that slides up and down such slot 72 as the shroud is raised and lowered. This keeps the shroud from rotating and limits the travel up and down. It also provides the water connection to a flexible plastic tube 74 which goes to the four-way valve 36.

The lower portion of the shroud guides 16a, 18a extends through and is attached to the ceiling 76 (see also FIG. 2) of the bottle-filling area by a flange 78. The flange 78 is canted to the perpendicular to compensate for the slanting, off-level ceiling 76 which, in turn, corresponds to the backward slope of the floor 20. This causes the shroud assembly to be vertical and plumb. The backward slope of the stainless steel floor 20 to a back drain 80 not only accommodates any water that may be spilled, but also makes it easier for the consumer to slide a jug 60 under the sanitary fill spouts 16, 18. The ceiling 76 and floor 20 of the fill area are parallel to one another so that side panels of the side boxes 82 can be easily removed for service.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

That which is claimed is:

1. A water dispensing machine, comprising,
a first elongate fill tube member,
a second elongate fill tube member,
a first piston member slideably mounted interiorly of said first fill tube member and reciprocable therein between a first and second position,
a second piston member slideably mounted interiorly of said second fill tube member and reciprocable therein between a first and second position,
first inlet means for admitting water into a first end of said first fill tube member to displace said first piston member from its first position to its second position,
second inlet means for admitting water into a first end of said second fill tube member to displace said second piston member from its first position to its second position,
first outlet means for discharging previously admitted water from a second end of said first fill tube member responsive to the displacement of said first piston member,
second outlet means for discharging previously admitted water from a second end of said second fill tube member responsive to the displacement of said second piston member, a unidirectional indexing means for sequentially and alternatingly activating said first and second inlet and outlet means, said indexing means comprising a four-way valve member for sequentially directing water to the first inlet means of said first fill tube member, to the second inlet means of said second fill tube member, to the outlet means of first fill tube member and to the outlet means of said second fill tube member, a coin accepting means for mechanically activating said indexing means attendant each acceptance by said machine of a preselected value of coins, a rotatably mounted plate member, said plate member having a plurality of four equidistantly spaced pin members projecting therefrom, an elongate flexible rod member adapted to abuttingly engage said pin members in sequence responsive to sequential acceptance by said machine of coins, and to rotate said plate member an equal angular amount each rotation, and said four-way valve member conjointly rotatable with said plate member, whereby a predetermined volume of water is dispensed from said first and second fill tube members responsive to each acceptance of coins by said machine.

2. The machine of claim 1, wherein said four-way rotatable valve member includes a cylindrical valve body member, a grooved rotor member rotatably mounted therein, and wherein said body member is provided with a plurality of four circumferentially and equidistantly spaced port members formed therein, said grooves in said rotor adapted to bring circumferentially adjacent pairs of said ports into fluid communication with one another at each rotor setting, and said rotor means being rotatable conjointly with said plate member so that circumferentially adjacent port members are sequentially brought into fluid communication with one another to effect valving of said machine.

3. The machine of claim 2, wherein the pistons slidably disposed within said respective fill tube members are provided with annular grooves formed in their respective peripheral sidewalls, and wherein a pair of exterior and interior sealing ring members are disposed in said groove such that the exterior ring member overlies the interior ring member, said exterior ring member being formed of a resilient material so that it conforms to the sidewalls of its associated fill tube member attendant piston travel to thereby prevent leakage of water thereabout.

4. The machine of claim 3, wherein said fill tubes are capped at their longitudinally spaced opposite ends by end plug members, wherein a different sealing ring member having a diameter less than the diameter of its associated end plug member is fixedly secured to the inwardly facing, opposed faces of each of said end plug members in concentric relation to the cylindrical peripheral boundaries of said end plug members, and wherein a central aperture is formed in each of said end plug members to admit or discharge water into or from said respective fill tube members.

5. The machine of claim 4, wherein said end plug members are provided with a second aperture means disposed in radial relation to said central aperture means and disposed radially outward of said concentric sealing ring members so that water can be discharged from a fill tube through said second aperture means and not only through said fill tube outlet means, when desired.

6. The machine of claim 5, further comprising,
a support surface for supporting a jug or other potable container,
a water discharge nozzle means, and
means for centering said jug in discharged water-receiving relation to said nozzle means.

7. The machine of claim 6, wherein said support surface is rearwardly sloped to provide a part of said centering means.

8. The machine of claim 7, wherein said discharge nozzle means is disposed in surrounded relation to an open-ended shroud means, and wherein the open end of said shroud means is specifically configured to conform to the contour of said jug means so that the mating of said specifically conformed open end and said upper contour of said jug means provides a part of said centering means.

9. The machine of claim 8, further comprising,
a shroud guide means,
said guide means comprising a tubular member,
said shroud member being telescopically received within said guide member,
whereby said shroud is free to move in a vertical plane relative to said guide means and relative to said nozzle means such that insertion of a jug under said shroud transiently displaces said shroud vertically and such that said shroud seats on the upper portion of said jug thereafter.

10. The machine of claim 9, wherein a vertical slot is formed in said shroud guide member, wherein a flexible water line interconnects said discharge nozzle means and said outlets, and wherein said flexible line reciprocates within said slot attendant rising and falling of said shroud.

* * * * *